United States Patent
Austin, Jr.

[15] 3,668,498

[45] June 6, 1972

[54] TRANSFER APPARATUS WITH DIGITAL PATH CONTROL

[72] Inventor: Albert A. Austin, Jr., Grand Blanc, Mich.

[73] Assignee: Atlas Automation, Inc., Fenton, Mich.

[22] Filed: Apr. 20, 1971

[21] Appl. No.: 135,700

[52] U.S. Cl. .................................................318/568, 318/574
[51] Int. Cl. ....................................................G05b 19/42
[58] Field of Search.................318/568, 569, 570, 571, 574

[56] References Cited

UNITED STATES PATENTS

| | | | |
|---|---|---|---|
| 3,317,894 | 5/1967 | Jensen | 318/569 X |
| 3,321,744 | 5/1967 | Jensen | 318/569 X |
| 3,492,552 | 1/1970 | Usami et al. | 318/574 |
| 3,517,286 | 6/1970 | Stobbe | 318/574 |

*Primary Examiner*—Benjamin Dobeck
*Attorney*—McGlynn, Reising, Milton & Ethington

[57] ABSTRACT

Transfer apparatus is disclosed for use with a cyclically operated material processing machine such as a power press or the like. The apparatus comprises a transfer unit which includes a workpiece holder with separate drive means for displacement along horizontal and vertical axes and, if desired, for rotation about a third axis. A transfer unit may be mounted on the input or output side of the processing machine or a pair of units may be used for loading and unloading if desired. A transfer unit is provided with a control system adapted for two modes of operation, the set up or teaching mode and an automatic mode for production runs. The control system comprises data storage means suitably in the form of a pinboard matrix in which stored data defines coordinates of selected points on a predetermined transfer path and the direction and velocity of movement between successive points. During the teaching mode of operation a manual controller enables an operator to move the transfer unit stepwise through a cycle of operation on a trial basis to establish the transfer path and the accelerations and velocities of the workpiece holder. The data storage means includes manually settable elements which enable the operator to store the necessary data for a given segment of the transfer path when a trial movement is satisfactory. When all of the control data is established in the storage means for the entire transfer path the control means are switched to automatic operation and the apparatus is ready for production operation. Since the transfer apparatus has its own drive means it need not be integrally connected with the mechanism of the processing machine. Instead of timing signal generator connected with the control system provides for synchronization of the movements of the transfer apparatus with the cyclic operation of the machine.

24 Claims, 10 Drawing Figures

TRANSFER APPARATUS WITH DIGITAL PATH CONTROL

This invention relates to material handling equipment and more particularly to transfer apparatus with an automatic control system. In one particular application the transfer apparatus of this invention functions as a workpiece loader or unloader for a press or other cyclically operated material processing machine.

In the automation of manufacturing operations such as material processing and handling it is necessary to move a workpiece from one processing machine to the next in properly timed relation so that the several machines may operate at rated capacity. Furthermore, in feeding a workpiece into a given machine or removing it from the machine it is often necessary that the transfer path have a particular configuration according to the shape of the workpiece and the operating parts of the machine. In the case of a sheet metal forming line, for example, a typical installation would include a draw press followed by a trim press with suitable conveyors, loaders and unloaders interconnecting the machines on the line. Heretofore, it has been the practice to construct a transfer mechanism which is especially adapted for a given workpiece and a given press. The difficulty with this is that the transfer mechanism must be changed when a new workpiece design and hence the tooling of the press are changed. One such system which is commonly known is a transfer mechanism which is operated in synchronism with the press drive by a power take off from the press drive and which uses a series of cams for controlling the direction and velocity of movement of the loader and unloader mechanisms. A particular shortcoming of this system, however, is the need for changing the cams and of the mechanism to adapt the transfer apparatus when the tooling of the press and the workpiece to be processed thereby are changed.

In accordance with the present invention a transfer apparatus is provided which will cause the workpiece holder to traverse any desired path configuration for executing a loading or unloading operation of a given processing machine. Furthermore, the transfer path configuration may be readily changed to adapt the transfer apparatus to a change in the processing machine and the workpiece processed thereby. This is accomplished by providing a transfer apparatus with a self contained or separate power drive means and a programmable control for establishing the transfer path. Thus, the transfer apparatus is adaptable to different machines which need not be of special design to accept the transfer apparatus. Further in accordance with the invention the transfer apparatus is caused to move in timed relation with the cyclical operation of the processing machine without the need for a power take off therefrom or a common drive means. This is accomplished by separate drive means for the workpiece holder of the transfer apparatus together with a control system which uses a timing signal to coordinate the movement of the workpiece holder in its predetermined path with cyclic motion of the processing machine.

Another feature of the invention is the provision of a point to point control system for establishing the transfer path for the workpiece holder. This is effected by drive means for moving the workpiece holder along two axes and a programmable control system which includes a data storage means for defining the coordinates of plural selected points along the desired transfer path. Further, the velocity of the workpiece holder between adjacent points may be programmed at different values suitable for the particular operation. This is done by setting velocity information in the data storage means for use by the control system.

Further, in accordance with the invention a transfer path of a workpiece holder may readily be established or programmed to accommodate a particular workpiece of the processing machine. This is accomplished by providing a manual controller which enables the manual supervision of movement of the transfer apparatus through a complete cycle of operation. For this purpose the direction and velocity between one point and a projected second point are manually set in the controller and the motion of the workpiece is observed. When a satisfactory segment of the transfer path is found, suitably by trial and error, between successive points the coordinates of the destination point and the velocity of travel are set in the data storage means of the control system. In this manner the entire transfer path to be traversed by the workpiece holder is established for a given workpiece. Further, acceleration and deceleration of the workpiece holder are established at a desired values by the programming operation. This is determined by the changes in the velocity between adjacent segments of the transfer path and by the response characteristic of the control system and the drive means.

Further, in accordance with the invention the workpiece holder of the transfer apparatus may be provided with drive means and a control system which enables the position and attitude of the workpiece to be predetermined for any point in the transfer path. This is accomplished by a loader or unloader unit which includes a workpiece holder with first and second drive means for translational movement thereof along first and second axes and a third drive means for angular adjustment thereof about a third axis. Preferably, the translational drive means includes a motor and a lead screw arrangement. The control means includes a separate data storage means for each control axis so that the coordinate of each point of the transfer path and the velocity of movement thereto may be established relative to each axis.

Accordingly the invention provides transfer apparatus adapted for moving a workpiece relative to a cyclically operated processing machine in a predetermined transfer path. The apparatus comprises a workpiece holder with motive power means connected therewith which is energized by a control means in accordance with the desired transfer path. Signal generating means are adapted to produce destination signals corresponding to plural selected points on the transfer path in succession and the control means are operative to energize the motive power means to displace the workpiece holder to the destination points. To insure that the transfer apparatus and the processing machine are operated in timed relation a timing signal generating means connected with the processing machine produces an enabling signal at a predetermined point in each cycle of operation. Sequence means which is responsive to the arrival of the workpiece holder at the destination point and the occurrence of the enabling signal produces a sequence signal. The sequence means is connected with the destination signal generating means causes a signal corresponding the succeeding destination point to be generated whereby the workpiece holder is caused to move to the next point in the predetermined transfer path. Additionally, a manual controller may be provided which includes manually settable elements for defining the position of successive points on the transfer path and the velocity of movement between such points.

A more complete understanding of this invention may be obtained from the detailed description which follows taken with the accompanying drawings in which.

Referring now to the drawings, there is shown an illustrative embodiment of the invention in a transfer apparatus adapted to load a sheet metal workpiece in a trim press and to unload or remove the same therefrom when the trim press operation is completed. It will be understood of course that the invention is applicable to other types of material processing machines for the purpose of performing either a loading operation or an unloading operation or both. The significant relationship is that the transfer apparatus is adapted to move the workpiece in a predetermined path and attitude into or out of a processing machine in properly timed relationship with the cyclic operation of the machine.

Figure 1:
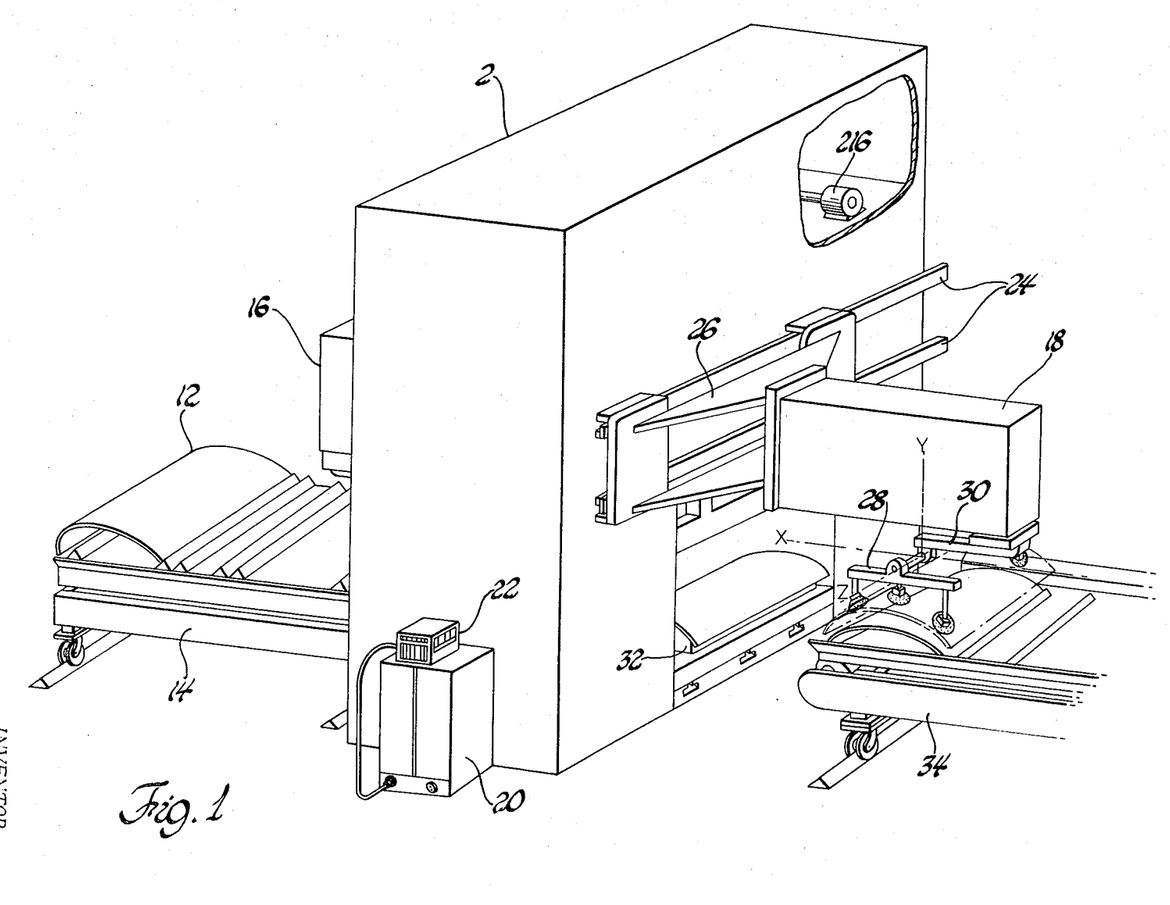
FIG. 1 is a perspective view of a typical installation of the subject invention on a trim press.

As shown in FIG. 1 the transfer apparatus is operatively installed on a conventional power press 2 suitablly of the type adapted for performing a trim operation. The press comprises a frame which supports a vertically reciprocable slide driven by the press drive means or motor in a cyclic operation. The slide carries a movable upper platen and associated die and the frame supports a fixed lower platen and its associated die in a conventional manner. A workpiece 12 is presented to the input side of the press by a conveyor 14 which suitably receives the workpiece from a preceding work station. The transfer apparatus of this invention comprises a workpiece loading unit 16 mounted on the frame of the press 10 on the input side thereof and unloading transfer unit 18 mounted on the frame of the press at the output side. The transfer apparatus also comprises a control unit 20 suitably installed adjacent the press and including a manual controller 22 as will be described in more detail subsequently. The loading unit 16 and the unloading unit 18 are suitably of identical construction and each is mounted on the frame of the press by a pair of rails 24 and an adjustable bracket 26. Each of the transfer units 16 and 18 includes a workpiece holder 28 which is provided with workpiece gripping means such as suction cups adapted to be actuated to hold or release the workpiece. The transfer unit includes a power driven carriage 30 which is translationally moveable along a horizontal $x$ axis and a vertical $y$ axis. Additionally, the workpiece holder is angularly adjustable about a horizontal $z$ axis. The loading unit 16 is energized by the control unit 20 to move the workpiece holder to pick up the workpiece 12 from the conveyor 14 and move it through a predetermined transfer path to place it on the lower die 32 in the press. The transfer unit 16 then retracts its workpiece holder to pick up a new workpiece and commence a new cycle of operation. After the initial retraction of the workpiece holder of loading unit 16 the press closes the upper and lower dies to perform the trim operation and then opens the dies. In timed relation with the cycle of the press operation, the unloading unit 18 moves the workpiece holder 28 into the open space between the dies and picks up the workpiece and transfers it through a predetermined path to a conveyor 34. Then the unloading unit 18 starts a new cycle of operation in timed relation with the cyclic operation of the press 10.

Figure 2:
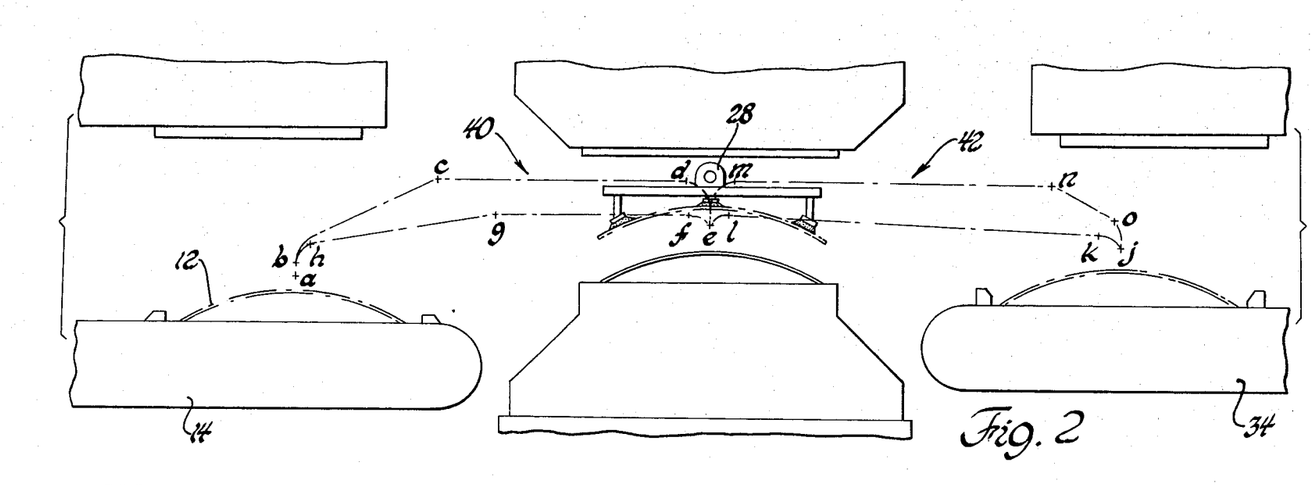
FIG. 2 is a diagrammatic representation of the transfer path of the workpiece holder.
Figure 3:
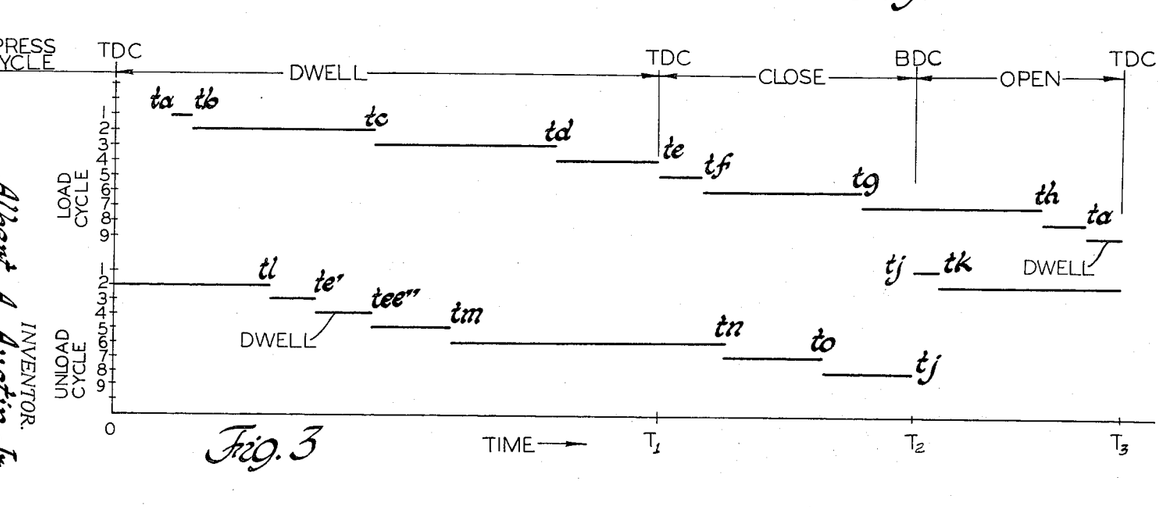
FIG. 3 is a graphical representation of the movements of the workpiece holder as a function of time correlated with the press positions.

Referring to FIG. 2, there is shown in diagrammatic form a transfer path 40 for a press loading cycle and a transfer path 42 for a press unloading cycle. In FIG. 3 there is shown a graphical representation of the point to point movement in the transfer path 40, the point to point movements in the transfer path 42 and the relationship of the full cycle of press operation all as a function of time. Note in FIG. 3 that the starting point or zero time the press cycle of operation has just reached its zero degree or top dead center position. Until time T1 the upper press platen dwells as indicated in FIG. 3 at the top dead center position. Then as indicated during the time interval T1 to T2 the press closes and the platen moves from top dead center position to the bottom dead center position; and in the time interval time T2 to T3 the press opens and the platen returns to the top dead center position.

It will be assumed that for the particular press and workpiece it is desired to establish a loading transfer path 40 as shown in the position diagram of FIG. 2 and having a time diagram as shown in FIG. 3. Similarly, the unloading transfer path 42 is to have the position diagram shown in FIG. 2 and the time diagram shown in FIG. 3. Consider the loading cycle as executed by the loading unit 16. Starting with the workpiece holder 28 in position over the workpiece 12 on the conveyor 14 a first move of the workpiece holder 28 (with suction cups actuated) is from point $a$ to point $b$ in a vertical direction to lift the workpiece off the conveyor to gain clearance for lateral movement. Note in FIG. 3 that the load cycle as labeled on the ordinate axis comprises multiple movements which are numbered 1 through 9 each of which occurs over a time interval indicated by the corresponding bar graph. Note that the move from point $a$ to point $b$ occurs over the time interval $ta$ to $tb$. The movement from point $b$ to point $c$ occurring in the time interval $tb$ to $tc$ starts with an arcuate motion and proceeds in a straight line with components of motion in both the $x$ axis direction and the $y$ axis direction. It is observed that the direction of motion is determined by the relative velocities of movement along the respective axes; the movement is in a straight line when the velocities are of constant value and is arcuate during intervals of changing velocity or acceleration along either axis. The movement from point $c$ to point $d$ is a straight line in the horizontal direction over the time interval $tc$ to $td$. Note that this movement is effected by zero velocity along the $y$ axis and by a relatively high velocity along the $x$ axis. The fourth movement between points $d$ and $e$ is initially arcuate and is effected by increasing velocity downwardly along the $y$ axis and a velocity which decreases to zero along the $x$ axis, thereby resulting in a straight vertical motion to the point $e$. At this point the workpiece 12 has been lowered onto the die and the suction cups are actuated to release the workpiece. It is noted at this point that the platen of the press remains in the dwell portion of its cycle at the top dead center position. The workpiece holder is now to be withdrawn from the press to permit closing of the press and completion of its cycle. Accordingly, the point to point movement of the workpiece holder continues with the fifth movement from point $e$ to point $f$ which is an arcuate path effected by an increasing velocity upwardly along the $y$ axis and an increasing velocity to the left along the $x$ axis, both of which occur over the time interval $te$ to $tf$. At this point in time T1 the press begins to close with the platen moving downwardly from top dead center. At the same time the workpiece holder 28 commences the sixth movement from point $f$ to point $g$ which is effected with a high velocity along the $x$ axis and zero velocity along the $y$ axis. The motion is continued with the seventh movement from point $g$ to point $h$ during the time interval $tg$ to $th$ and during which interval the platen of the press reaches bottom dead center as indicated in the press cycle graph.

Then the cycle of movement of the workpiece holder 12 is completed with the 8th and final movement between the point $h$ and the point $a$ which is an arcuate segment produced by a decreasing velocity in the direction of the $x$ axis and increasing downward velocity in the direction of the $y$ axis. When the point $a$ is reached the workpiece holder 28 dwells for a time interval from $ta$ to T3 during which the suction cups of the holder are actuated to grip the succeeding workpiece from the conveyor 14 in readiness for the performance of another cycle. The end of this cycle is noted in FIG. 3. The press cycle is completed and the platen has returned to the top dead center position.

The unloading cycle in the transfer path of the position diagram of FIG. 2 and in the time diagram of FIG. 3 can be traced through in the same manner as just described for the loading cycle. It is to be noted that the first movement of the unloading cycle causes the workpiece holder of the unloading unit 18 to move from the point $j$ over the conveyor 34 to the point $k$. Note that as shown on FIG. 3 this movement occurs during the time interval $tj$ to $tk$ and commences ac the time T2 when the platen begins to move from bottom dead center toward the open position in the press cycle. The second movement between the point $k$ and the point $l$ occurs while the press is opening and continues after the platen reaches top dead center and during a portion of the dwell period of the press. Then a third movement, from point $l$ to point $e$, occurs to lower the workpiece holder onto the workpiece in the press.

This movement is followed by a dwell interval during which the suction cups of the holder may be actuated to grip the workpiece in the press. The fifth movement, from point e to point m, lifts the workpiece off the die, and the sixth movement, from point m to point n, withdraws the workpiece from the press over a time interval tm to tn, during which the platen is in its dwell position, and then commences to close. The seventh movement in the unloading cycle, from point n to point o, lowers the workpiece toward the conveyor 34, and the eighth and final movement from point o to point j places the workpiece on the conveyor 34 and the suction cups are actuated to release the workpiece so that the unloading unit 18 is ready for the next cycle of operation.

Figure 4:
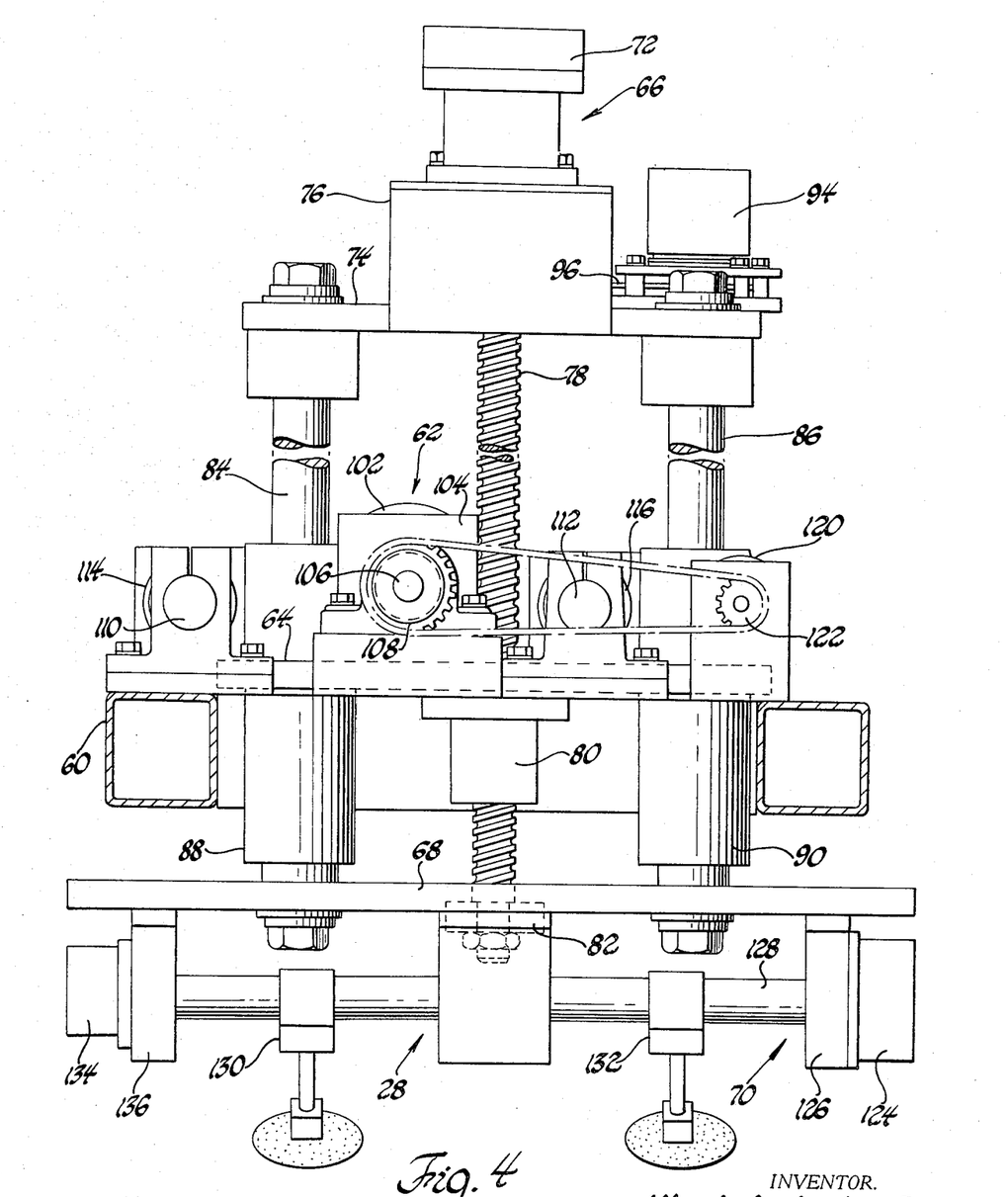
FIG. 4 shows the transfer unit including the workpiece holder.

Referring now to FIG. 4, the unloading transfer unit 18 will be described, it being understood that the loading transfer unit 16 is of identical construction. The transfer unit comprises a fixed horizontal rectangular frame 60 which supports a horizontal drive means 62 which, in turn, drives a horizontal carriage plate 64 along the direction of the horizontal x axis; i.e., into the plane of the paper. The horizontal carriage plate 64 in turn supports a vertical drive means 66 which is adapted to drive a vertically movable carriage plate 68 along the vertical or y axis. The carriage plate 68 supports the workpiece holder 28 and the drive means 70 which is adapted to rotate the workpiece holder about a horizontal or z axis.

Referring now to the transfer unit in greater detail, the vertical drive means 66 for the carriage plate 68 comprises a hydraulic rotary motor 72 mounted on a support head 74 and connected through a drive coupling 76 to a lead screw 78. The lead screw 78 is drivingly connected with a travelling nut 80, preferably a ball nut, and the lower end of the lead screw is mounted in the carriage plate 68 by a bearing 82. The travelling nut 80 is fixedly mounted on the lower side of the horizontal carriage plate 64. The vertically movable carriage plate 68 is fixedly connected with the support head 74 by a pair of guide shafts 84 and 86 which are slidably mounted in cylindrical bushings 88 and 90, respectively, which are rigidly secured to the horizontal carriage plate 64. Thus, the carriage plate 68 and, hence, the support head 74 are vertically movable relative to the support frame 60 and the horizontal carriage plate 64 by energization of the hydraulic motor 72 and rotation of the lead screw 78. It is noted that the hydraulic motor 72 is reversible and, hence, the carriage plate 68 may be raised or lowered to any desired position within the range of movement. In order to produce an electrical signal corresponding to the actual position of the workpiece holder 28 along the vertical or y axis, a rotary pulse generator 94 is driven by the hydraulic motor 72 through the drive coupling 76 and through sprockets and roller chain 96. As will be described subsequently, the rotary pulse generator 94 is adapted to generate an electrical pulse corresponding to equal increments of rotation, the pulses being of one phase for forward rotation and upward movement and of the opposite phase for reverse rotation or downward movement.

The horizontal drive means 62 for the horizontal carriage plate 64 comprises a rotary hydraulic motor 102 which is connected through a drive coupling 104 to a lead screw 106, which is mounted for rotation on the fixed frame 60. A travelling nut 108 is fixedly mounted on the horizontal carriage plate 64 so that rotation of the lead screw 106 causes movement of the horizontal plate 64. A pair of guide shafts 110 and 112 are fixedly mounted on the frame 60, and a pair of cylindrical guide sleeves 114 and 116 are fixedly mounted on the carriage plate 64 and slidably mounted on the shafts 110 and 112, respectively. The hydraulic motor 62 may be reversibly energized to rotate the lead screw 106 and thus cause the carriage plate 64 and hence, the workpiece holder 28 to move as desired within the range of movement. In order to produce an electrical signal corresponding to the position of the workpiece holder, a rotary pulse generator 120 is connected with the hydraulic motor 102 through the drive coupling 104 and the sprockets and roller chain 122. The pulse generator 120 is adapted to produce an electrical pulse for each increment of rotation, with the pulses being of one phase for outward movement of the holder 28, and of the opposite phase for inward movement of the holder 28.

Angular positioning of the workpiece holder 28 about the horizontal or z axis is provided by a drive means 70 which includes a rotary hydraulic motor 124, a drive coupling 126, and a rotary shaft 128, all of which are mounted on the carriage plate 68. The workpiece holder, including the support arms 130 and 132 and suction cups, are mounted on the rotary shaft 128 for movement therewith. In order to produce an electrical signal indicative of the angular position of the shaft 128 and, hence, the workpiece holder 28, a rotary pulse generator 134 is connected with the shaft through the drive coupling 136. The pulse generator 134 is adapted to produce an electrical pulse for each increment of rotation of the shaft 128. The generated pulses are of one phase for a clockwise direction of rotation, and are of the opposite phase for a counterclockwise rotation.

Figure 9:
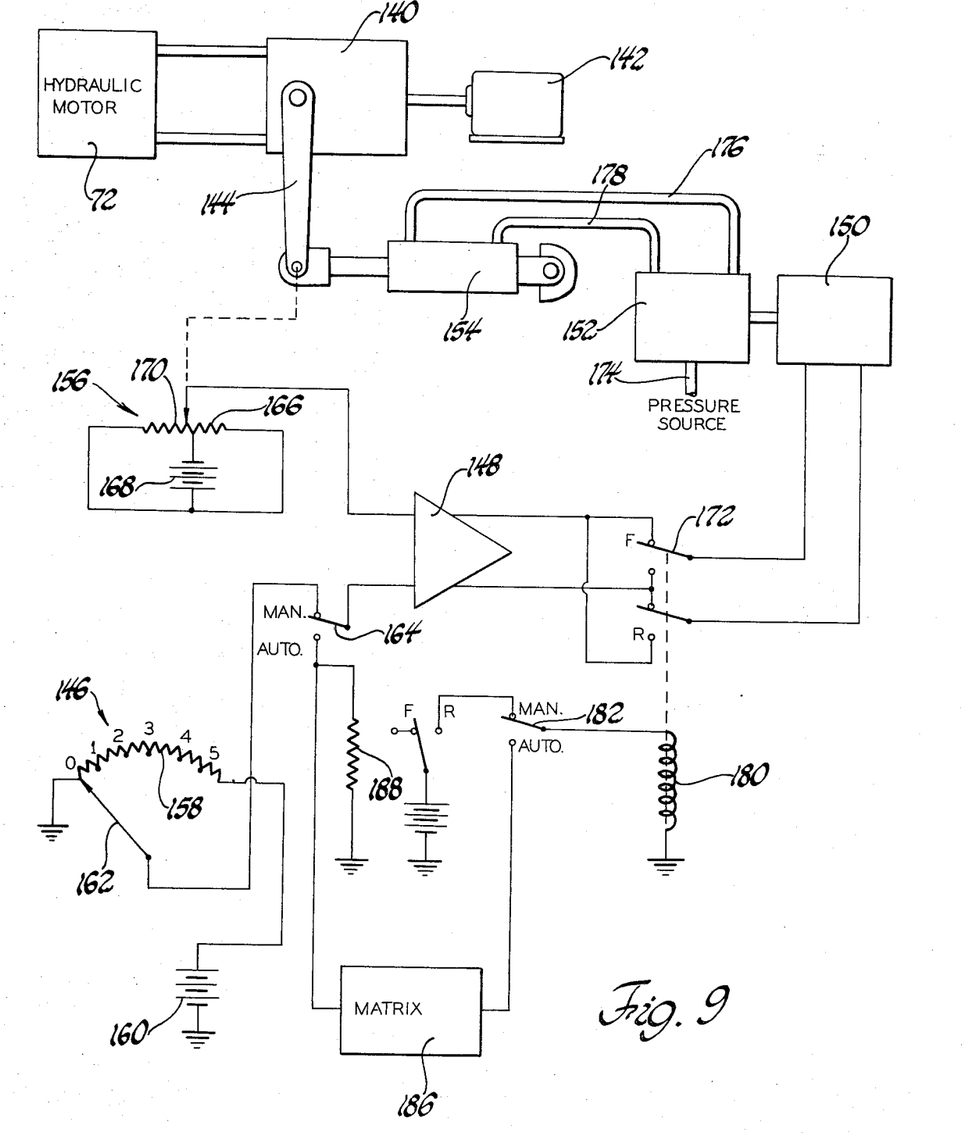
FIG. 9 is a diagram of the hydraulic motor and control elements of the drive means.

As just described with reference to FIG. 4, the transfer unit 18 is adapted to move the workpiece holder 28 in fore and aft directions along a horizontal or x axis by energization of the hydraulic motor 102, and to move the workpiece holder in the up or down direction along the vertical or y axis by energization of the hydraulic motor 72. Similarly, it is adapted to tilt the workpiece holder in either clockwise or counterclockwise direction about the horizontal or z axis by energization of the hydraulic motor 124. The rotary hydraulic motors referred to above may all be of the same type and may be provided with the same type of control system. The hydraulic motor control system for motor 72 will be described with reference to FIG. 9, it being understood that the same control systems may be used for motors 102 and 124. As shown in FIG. 9, the hydraulic motor 72 is energized by a positive displacement pump 140 which is driven by an electrical motor 142. The pump 140 is adapted for variable displacement whereby the speed of the motor 72 may be varied, and the direction may be reversed by reversal of the flow delivered by the pump. The pump may be of the swashplate type and provided with a control lever 144 which, in a neutral position, produces no flow and the hydraulic motor 72 is at a standstill. When the control lever 144 is displaced in the forward direction, the hydraulic motor is driven in the forward direction at a velocity proportional to the displacement. Similarly, when the control lever is displaced in the rearward direction, the motor is rotated in a reverse direction at a velocity proportional to the displacement. For the purpose of controlling the pump 140 in accordance with electrical input signals, an electro-hydraulic control system is provided which comprises a manually controlled input circuit 146, an amplifier 148, and a reversible solenoid 150. The solenoid 150 actuates a pilot valve 152 which, in turn, controls a hydraulic servo motor 154 which is connected with the control lever 144 which, in turn, is connected with a follow-up or rebalancing circuit 156.

Referring to this control system in greater detail, the speed of hydraulic motor 72 may be manually set by the control knob of the manually adjustable potentiometer 158 which is excited with a DC voltage source 160 and has its movable contact 162 connected through a selector switch 164 to one input of the amplifier 148. The amplifier 148 is suitably a differential or operational amplifier which produces an output voltage having a polarity corresponding to the difference in polarity across the respective inputs and having a magnitude proportional to the difference of the input voltages. The follow-up circuit 156 includes a potentiometer 166 which is excited with a DC voltage source 168, with its negative terminal connected to the midpoint of the potentiometer resistor and its positive terminal connected to the respective endpoints thereof. The potentiometer has a movable contact 170 which is electrically connected with the other input of the amplifier 148 and which is mechanically connected with the movable piston of the servo 154 which actuates the control lever 144. The output of the amplifier 148 is connected through a reversing switch 172 to the solenoid 150 which will actuate the pilot valve 152 in one direction or the other in accordance with the polarity of the amplifier output 148 and the position of the reversing switch 172. The pilot valve is connected with the source of fluid pressure by a conduit 174, and connects the source with an output conduit 176 or 178, depending upon the direction of actuation. The fluid pressure is thus delivered to the cylinder of the power servo 154 on one side of the piston or the other, depending upon the direction of actuation of the pilot valve. Accordingly, the control lever 144 is displaced from its neutral position in a forward or rearward direction, depending upon the sense of the input signals to the amplifier 148 and the position of the reversing switch 172.

In operation of the hydraulic motor 72 by manual control, it will be assumed that the movable contact 162 is set in the number 3 position, which causes a positive voltage to be applied to the first input of the amplifier 148. The motor 172 is initially at rest and, hence, the control lever 144 is in the neutral position and the movable contact of the potentiometer 176 is in its neutral position and, hence, supplies 0 voltage to the other input of the amplifier 148. With the reversing switch 172 in the forward position, the output voltage from the amplifier 148 is applied to the solenoid 150 with a polarity which causes actuation of the pilot valve 152 to the left. This, in turn, causes fluid pressure to be delivered through conduit 178 to the power servo 154, and displacement of the control lever thereby in the forward direction. The movable contact 170 of the follow-up potentiometer 166 is moved with the control lever and, thus, the voltage applied by the contact in the input of the amplifier 148 becomes increasingly positive. When the displacement of the control lever 144 has reached a position corresponding to speed setting number 3, the voltage on the movable contact 170 will be equal to the voltage on the movable contact 162 so that the output of the amplifier 148 will be reduced to 0 and the solenoid 150 will be de-energized, allowing the pilot valve 158 to return to its neutral position. Accordingly, the power servo 154 will retain its displaced position and the control lever 144 will be held in a position corresponding with speed number 3, so long as the input signal from the potentiometer 158 remains unchanged. The operation of the manual speed control for the hydraulic motor 72 for other speed position settings of the potentiometer 158, is similar to that just described.

It will now be apparent that the hydraulic motor 72 may be manually set at a desired speed and direction by the setting of the potentiometer 158 and the reversing switch 172. Automatic control of the speed and direction of the hydraulic motor is provided also as shown in the circuitry of FIG. 9. For this purpose, a speed control voltage is supplied from a data storage means or matrix 186 and applied across a resistor 188. When the selector switch 164 is in the automatic position, this speed control voltage is applied to the input of the amplifier 148. In the automatic mode of operation, the direction of rotation of the hydraulic motor is also controlled by a voltage supplied from the matrix 186 to the lower fixed contact of the selector switch 182. Hence, when the selector switch 182 is in the automatic position and the voltage is applied by the matrix, the coil 180 of the reversing switch is energized and the switch contacts are moved to the reverse position. It will be understood that the hydraulic motors 102 and 124 may be manually and automatically controlled as to speed and direction in the same manner as described with reference to FIG. 9.

Figure 5:
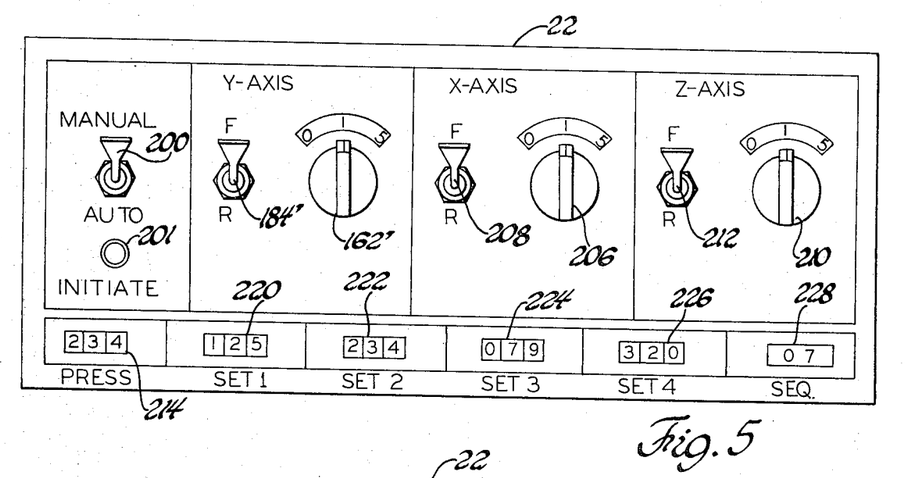
FIG. 5 shows a manual controller panel.

In order to facilitate manual control of the loading transfer unit 16 and the unloading transfer unit 18, the manual controller 22 previously referred to in the description of FIG. 1, is provided in the vicinity of the press. The controller 22 is electrically connected to the electrical cabinet 20 which houses the control circuits for the transfer units. As indicated in FIG. 1, the controller 22 is connected through a cable and plug to the left side of the cabinet 20 for the manual control of the transfer unit 16, and it may be connected by the cable and plug to the right side of the cabinet 20 for the manual control of transfer unit 18. The controller 22 is provided with a control panel as shown in FIG. 5. Note that the control panel includes a mode switch 200 for selection of manual or automatic operation and which is effective to position the selector switches 164 and 182 for control of motor 72. It also controls corresponding selector switches for motors 102 and 124. The control panel includes a speed control knob 162' connected with the potentiometer 158 for setting the speed of the hydraulic motor 72 which is in the y axis drive means. The reversing switch actuator 184' corresponds to the reversing switch 184 to control motor direction. Similarly, the control panel includes a control knob 206 and a reversing switch 208 for setting the speed and direction of the hydraulic motor 62 in the x axis drive means. Additionally, the panel includes a control knob 210 and the reversing switch 212 for controlling the speed and direction of the motor 124 in the z axis drive means. In the lower portion of the control panel a press position readout window 214 indicates the angular position of the press in its cycle of 360°. To supply this information the system includes, as shown in FIG. 1, a rotary pulse generator 216 mounted on the press and suitably connected with the drive means thereof. The pulse generator 216 is suitably of the type previously referred to, and supplies electrical pulses corresponding to equal increments of angular displacement, the pulses being reversible in phase or polarity according to the direction of rotation. The control panel is additionally provided with set point selectors in windows 220, 222, 224 and 226, each of which may comprise number thumb wheels to indicate angular position of the press in its cycle at which a given control function is to be performed, as will be described subsequently. An additional readout window 228 on the control panel shows the sequence number of the series of movements which the transfer unit is currently executing.

Figure 6:
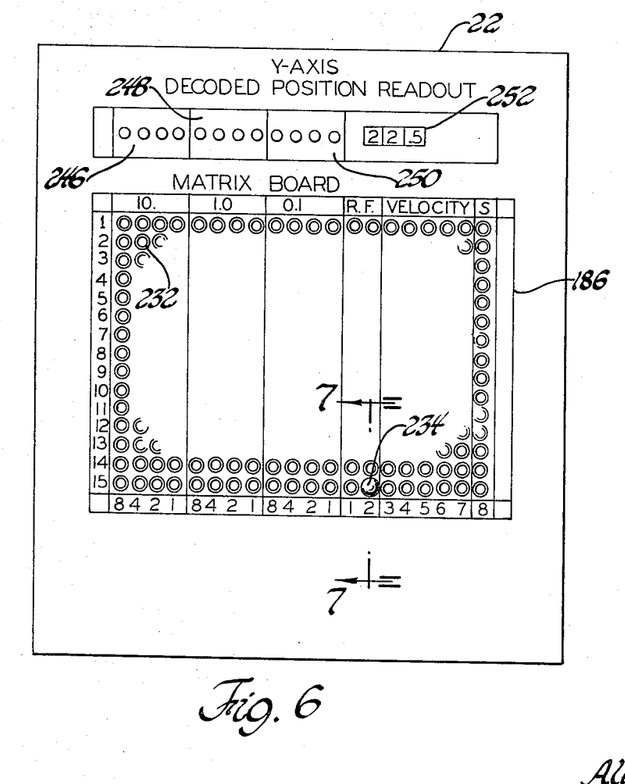
FIG. 6 shows the pinboard in the data storage means of the control system.
Figure 7:
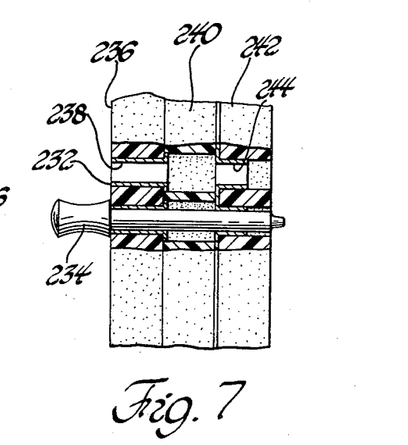
FIG. 7 is a view taken on line 7—7 of FIG. 6.

In order to define the selected points on the transfer path in terms of coordinates along each respective axis and to provide destination signals corresponding thereto, a data storage means in the form of a matrix or pinboard 186 is provided. As shown in FIG. 6, the pinboard may be mounted on the panel of the controller 22. The pinboard is of conventional construction and comprises an array of electrical sockets 232 which are disposed in columns and rows. Each socket is adapted to serve as a binary element for the storage of data in binary code. Each socket is adapted to receive a conductive pin 234, and may have two conditions; namely, the presence or absence of the conductive pin which correspond respectively to the numeral "1" and to the numeral "0" of binary code. As shown in FIG. 7 the pinboard is of laminated construction and includes an upper sheet 236 of insulating material. The pinboard also includes an intermediate sheet 240 of insulting material, and a lower sheet 242 of insulating material. The sockets 232 are formed by openings which extend through the three sheets of the lamination. It is noted that the outer sheet is provided with a conductive metal ferrule 238 in each socket, and the lower sheet 242 is provided with a conductive ferrule 244 in each socket, while the intermediate sheet 240 serves as an insulating spacer between the aligned ferrules. The conductive pin 234 is of such length that it extends from the conductive ferrule 238 to the conductive ferrule 244 when fully seated in the socket. Referring back to FIG. 6, it is noted that the rows of sockets are numbered 1 through 15 and the columns of sockets are grouped with appropriate headings. All of the conductive ferrules 238 in a given row are electrically connected together by an input bus or conducter, and all of the conductive ferrules 244 in a given column are connected together by an output bus or conducter. Each of the numbered rows of the pinboard sockets corresponds to a different selected point on the transfer path of the respective coordinate axis, and thus the pinboard of FIG. 6 provides for 15 different points. It is desired to define the coordinate of each point by a number of inches or other measurement units expressed in decimal form. For this purpose, the first set of columns represent tens, the second set of columns represent units, and the third set of columns represent tenths of inches. In these three sets of columns the numbers are represented in binary coded decimal form, with the rightmost position in each set being least significant. Thus, any position or coordinate expressed in inches or other units may be represented in each row at any value in the full range to an accuracy of one decimal point.

The columns on the pinboard labeled "F" and "R" are adapted to indicate the direction forward or reverse, respectively, required for the direction forward or reverse, respectively, required for the direction of movement in the transfer path to the next destination point. The five columns labeled "-Velocity" are adapted to present the speed setting in the range of 1 through 5 for the movement to be effected on the transfer path to the next destination point. The last column labeled "S" is adapted for use in establishing check points at which certain control functions are to be performed, as will be described subsequently. The panel of the controller 22 also includes a readout window with the first three sections 246, 248 and 250 presenting the actual position readout in binary form corresponding to the position of the workpiece holder along the respective coordinate axis. The last section 252 of the window is a readout in decimal form of the actual coordinate position.

Figure 10:
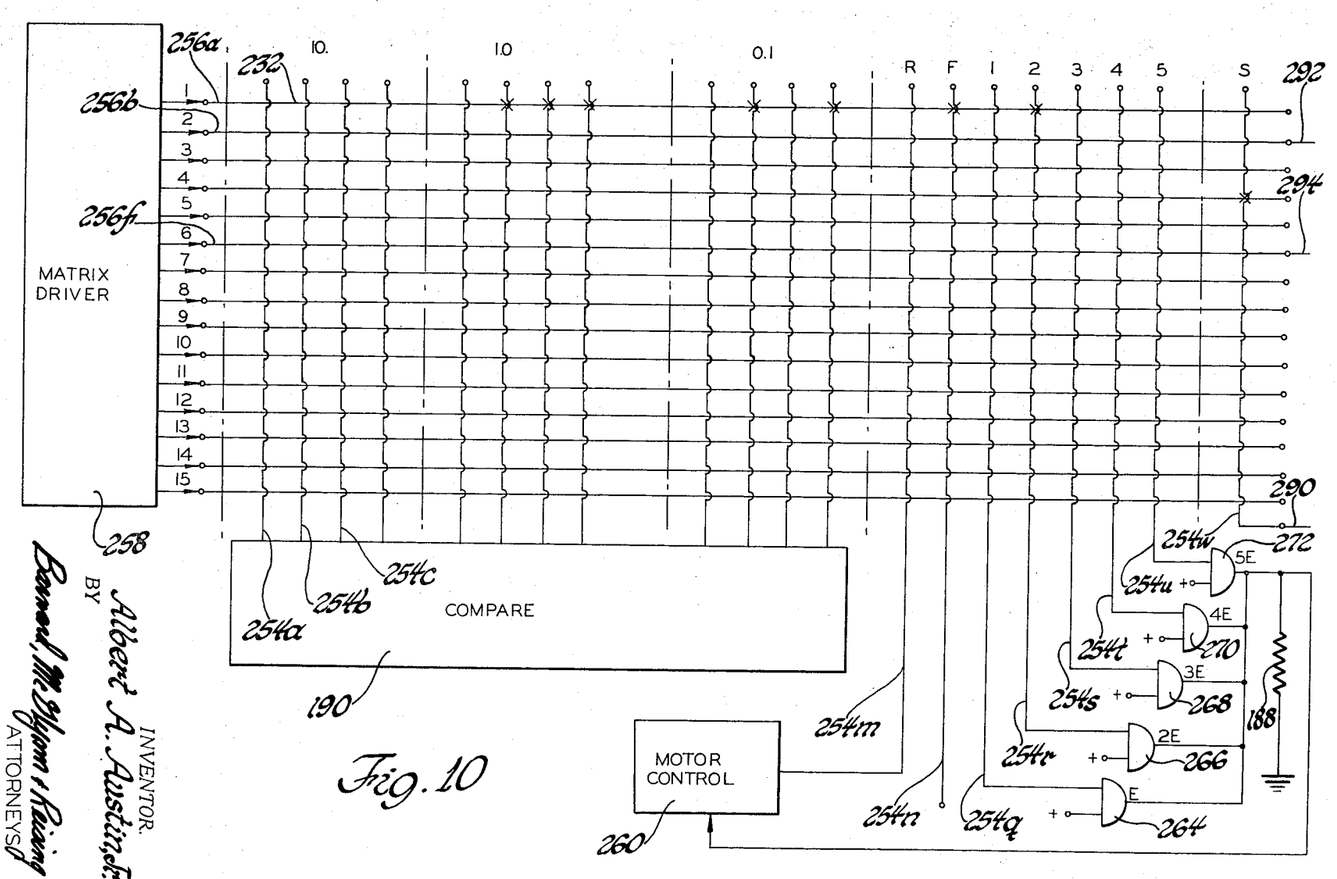
FIG. 10 is a diagram of the electrical connections of the pinboard and certain logic circuits of the control system.

Referring now to FIG. 10, the data storage means or pinboard 186 together with certain logic circuitry is shown in schematic diagram. Note that the array of sockets in the pinboard 186 shown in FIG. 10 corresponds to the array shown in FIG. 6. The sockets 232 in FIG. 10 are shown in schematic fashion by an arcuate segment in the output bus or conductor 254 overlying the intersection with the straight line of the input bus or conductor 256. The presence of a pin 234 in a given socket is indicated schematically by a small "x" over the socket. In order to read the data stored in the matrix all of the input conductors 256 are separately connected to the output of a reading means or matrix driver 258 which is adapted to apply an input voltage suitably of positive polarity to the input conducters in sequence in response to a sequence signal applied to the matrix driver. The matrix driver 258 may suitably take the form of a conventional ring counter. All of the output conducters 254 in the first 12 columns which are used to identify the coordinates of each point are connected separately to the input of the compare circuit which will be described subsequently. The output conductor 254m in the column below the reverse symbol "R" is connected with the motor control circuit 260. (As shown in FIG. 9 this output conductor is connected to the selector switch 182 and specifically to the fixed contact thereof labeled "automatic;" Thus, when an output voltage is present on this conducter the reversing switch 172 will be actuated. The output conductor 254n in the column below the symbol "F" need not be connected at all and is, in effect, a dummy input since the reversing switch 172 in the motor control circuit 260 is in the "forward" position in the absence of an input signal. This would be the case when a pin is positioned in the socket in the "F" column and with no pin located in the socket in the "R" column.) If desired the "F" and "R" columns may be omitted and direction information can be derived by the control circuit which compares actual position with the destination and which will be described later.

Speed control signals are provided for each destination point by the selection of one of the output conductors 254q, 254r, 254s, 254t or 254u. These output conductors are connected respectively to one input of AND gates 264, 266, 268, 270 and 272. Each of the AND gates has another input to which a "true" or positive voltage is applied, and when a positive voltage is applied to the first input of a given AND gate it will deliver a positive voltage at its output. The AND gate 264 is adapted to develop an output voltage "E," AND gate 266 develops an output voltage "2E," AND gate 268 develops an output voltage "3E," gate 270 develops an output voltage "4E," and gate 272 develops an output voltage "5E". The outputs of the several gates are connected together across the resistor 188 which, in turn, is connected across the speed control input of the motor control circuit 260. As described with reference to FIG. 9, the resistor 188 is connected to the selector switch 164 and, specifically, to the fixed contact in the position for automatic control of speed. Thus, the speed range which can be set in the manual controller by the potentiometer 158 may be duplicated in the automatic speed control by the selection of output conductor 254q through 254u which thereby applies a corresponding voltage in the range of "E" to "5E" to the input of the amplifier 148. In the column "S" the output conductor 254w may be energized at one or more of the destination points to establish such point as a check point for use in performing a control function such as gripper (suction cup) actuation or for synchronizing which will be described subsequently with reference to FIG. 8.

Figure 8:
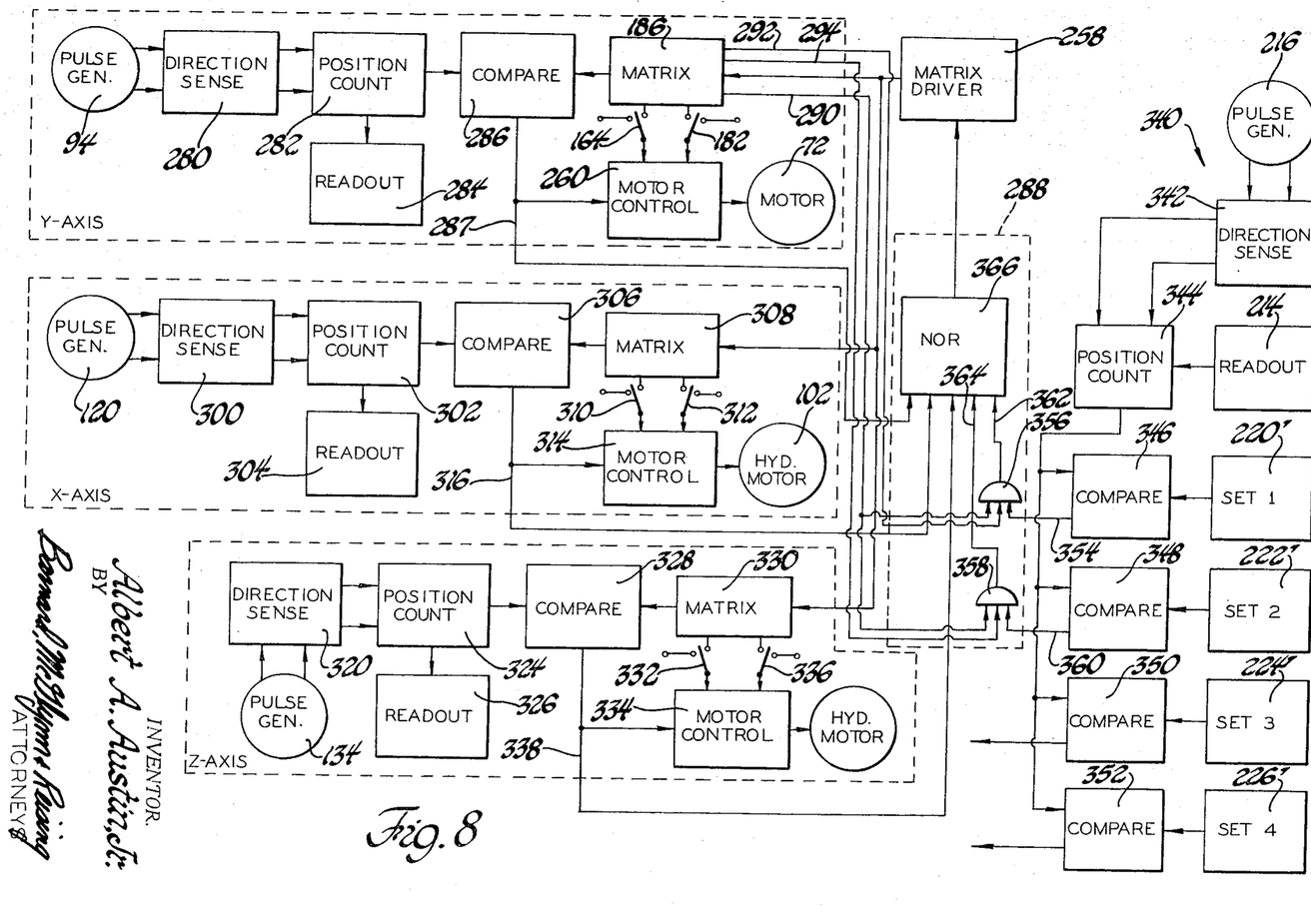
FIG. 8 is a block diagram of the control system.

Referring now to FIG. 8, the overall control system for the transfer unit is shown in block diagram. The y axis control system comprises the rotary pulse generator 94 which is driven by the hydraulic motor 72 and produces electrical pulses corresponding to equal increments of displacement having a phase corresponding to the direction of rotation. The output of the pulse generator 94 is connected to a direction sense circuit 280 which applies the pulses to a position counter 282. The direction sense circuit 280 is responsive to the phase of the pulses and is effective to increment the counter 282 when the motor is rotating in the forward direction, and is effective to decrement the counter when it is rotating in the reverse direction. Thus, the position counter 282 holds a count at all times which corresponds to the displacement along the y axis of the workpiece holder from its reference position. This position count is presented on the readout 284, and it is also applied to one input of the compare circuit 286. The destination point for the workpiece holder along the y axis is stored in the matrix or pinboard 186. Similarly, the direction of travel and the speed to be used in moving the holder along the y axis to the next destination point is stored in the matrix 186. The matrix is responsive to an input signal from the matrix driver 258 to produce an output which is applied to the other input of the compare circuit 286. This output represents the y axis coordinate of the next destination point on the transfer path. The input signals from the position counter 282 and from the matrix 186 to the compare circuit 286 are suitably in binary code form. This circuit will produce a true or positive output signal until such input signals become equal to each other, at which time the output of the compare circuit becomes false or zero. The output of the compare circuit is applied to the input of the motor control circuit 260 which is responsive to a positive or true input signal to energize the motor 72. The matrix 186 also supplies the motor speed control signal through the selector switch 164 and the direction signal through selector switch 182 to the motor control circuit 260. Thus, the motor 72 is energized in a direction and at a speed corresponding to data stored in the matrix 186 until the workpiece holder reaches the position on the y axis corresponding to the stored data in the matrix 186 which represents the position coordinates of the destination point. When this point is reached, the compare circuit 286 supplies a false or zero output signal to one input of the sequence means 288, which will be described presently. The matrix 186 also stores data which defines one or more check points which may be used to perform certain control functions. For each destination point, such as points k and n, which constitutes a check point a positive or true signal is applied over respective conductors 292 and 294 (see FIG. 10 also) to the sequence means 288 which will be described later. The presence of any pin in the "S" column as shown in FIG. 10 will produce a positive signal on conductor 290 which is also connected to the sequence means 288.

The x axis control system is similar to that just described with reference to the y axis, and will be described briefly. The rotary pulse generator 120 is driven by the hydraulic motor 102 and the output pulses therefrom are applied through the direction sense circuit 300 to the position counter 302. The counter 302 thus holds a count which corresponds to the displacement of the workpiece holder along the x axis from its reference position. This position is displayed by the readout 304, and the position signal is applied to one input of the compare circuit 306. The system includes a matrix 308 which stores the data which represents the x axis coordinates of the several destination points on the transfer path. The matrix applies the destination signals corresponding to the coordinate of the next point to the other input of the compare circuit 306 in response to an input signal from the matrix driver 258. The matrix 308 also stores data corresponding to the direction and the speed of travel along the x axis which is supplied respectively through the selector switches 310 and 312 to the motor control circuit 314. The compare circuit 306 supplies a positive or true signal to the motor control circuit until the actual position signal is equal to the destination signal, and at that time a zero or false signal is applied through conductor 316 to the sequence means 288.

The z axis control system is also similar to the y axis control system and will be described briefly. This system comprises a rotary pulse generator 134 which is connected through a direction sensing circuit 320 to an angular position counter 324 which holds a signal corresponding to the angular displacement about the z axis of the workpiece holder from its reference attitude. This position is presented by a readout 326 and the position signal is also applied to one input of a compare circuit 328. A matrix 330 stores data which represents the angular position of the workpiece holder for each point on the transfer path. This data is supplied to the other input of the compare circuit 328 in response to an input signal from the matrix driver 258. The matrix 330 also stores data corresponding to the direction and velocity of movement of the workpiece holder about its z axis for each destination point on the transfer path. The direction signal is applied through selector switch 332 to the motor control circuit 334 and the speed signal is applied through selector switch 336 to the motor control circuit. The compare circuit 328 will produce a positive or true output signal until the position signal from counter 324 is equal to the destination signal from the matrix 330. This output signal is applied through conductors 338 to the motor control circuit 334 and also to the sequence means 288.

In order to insure that the transfer unit is operated in properly timed or synchronized relation with the press a set point control circuit 340 is provided. This circuit comprises a rotary pulse generator 216 which, as indicated in FIG. 1, is connected with the drive means of the press. The output of the generator is supplied through a direction sense circuit 342 to the input of a position counter 344. The position counter holds a count which corresponds to the angular position of the press platen from its reference or top dead center position and such a position is displayed by the readout 214. The position signal taken from the output of the position counter 344 is applied to one input of each of compare circuits 346, 348, 350 and 352. The other input of each of the compare circuits is manually set by counters 220, 222, 224 and 226 as set point number one, set point number two, set point number three, and set point number four, respectively, which were also described with reference to FIG. 5. The set point circuits 220', 222' corresponding to set points numbers 1 and 2 are manually adjustable as by thumb wheels on the controller 22 of FIG. 5 to establish or set angular positions of the press platen at which a control function is to be performed in connection with the unloading transfer unit 18 for which the control system is shown in FIG. 8. The set point circuits 224' and 226' and the compare circuits 350 and 352 connected therewith are of the same construction as the circuits just referred to and form a part of the control system for the loading transfer unit 16 to perform a control function in connection therewith. A particular control function performed by the set point circuits is that of causing interruption of the movement of the transfer unit until the press platen has reached the angular position set into the set point circuit. For this purpose the set point circuit 220 may be set at an angular position of the press platen which should occur before the workpiece holder of the unloading transfer unit 18 moves inwardly toward the press beyond the point k on the transfer path. It may be determined for example that the proper clearance is provided for the workpiece holder when the platen has started to open and is at an angular position of 234° which as shown in FIG. 3 occurs just before the point k is reached. Accordingly, unless and until the signal of the position counter circuit 344 becomes equal to the signal of the set point circuit 220' the compare circuit 346 will produce a positive or true output signal on conductor 354. This output is applied to one input of an AND gate 356 in the sequence means 288. The selection of the point on the transfer path such as the point k as a check point beyond which the workpiece holder should not advance until the press platen reaches the set point angle is established in the matrix 186 of the y axis control system as described with reference to FIGS. 6 and 10. The sockets in the "S" column may be used for the selection of any of the transfer path points to be used as a check point. Thus by placement of a pin 234 in the socket corresponding to point k (i.e. line 2 on the matrix) a positive or true signal will be produced on the output line for conductor 254w when the matrix driver of the data reading means has advanced the readout to the line in which the pin is located. This signal is applied over conductor 290 to the other input of the AND gate 356 in the sequence means 288. The conductor 290 is also connected to one input of an AND gate 358, another input of which is connected to the output conductor 360 of the compare circuit 348. The set point circuit 222' may be used with the compare circuit 348 in the same manner as described with reference to circuits 220' and 346 to establish another set point control for interrupting movement of the workpiece holder until the press platen has reached a second predetermined angular position.

The outputs of the AND gates 356 and 358 are applied over conductors 362 and 364, respectively, to inputs of a NOR circuit 366. Additionally, the output of the compare circuit 286 is applied over the conductor 287 to another input of the NOR circuit 366. Similarly, the outputs of the compare circuits 306 and 328 are applied through conductors 316 and 338, respectively, to separate inputs of the NOR circuit 366. The NOR circuit is operative to produce a true or positive output only when there is no true or positive input on any of the input conductors. Until the workpiece holder has reached the next destination point on the y axis the input to the NOR circuit by conductor 287 will be a positive signal. Similarly, until the workpiece holder has reached its corresponding destination point on the x axis and about the z axis, the signal applied to the NOR circuit through conductors 316 and 338 will be positive. When the destination point is reached on all axes the input to the NOR circuit on conductors 287, 316 and 338 will become false or zero and these inputs will not inhibit the NOR circuit output. At least one check point will be established by a pin in the "S" column of matrix 186 so the conductor 290 will always apply a true or positive signal to the AND gates 356 and 358. If the destination point, for example point k, which has been reached is not a check point there will be no connection from the input conductor 256b of the matrix to the conductor 292 and the input signal thereon will be zero. Accordingly, the output of the AND gate 356 which is applied to the other input to the NOR circuit conductor 362 will also be false or zero regardless of the input on conductor 354. Accordingly, the NOR circuit will produce a true or positive output signal which is applied to the input of the matrix driver 258 to advance the reading means for readout of the data corresponding to the next destination point.

On the other hand, assume that the destination point just reached as noted above was selected as a check point by the insertion of a pin in the S column of the matrix 186 and connection of the matrix input conductor 256b to gate 356 on conductor 292. The signal on the conductor 290 and applied to the input of the AND gates 356 and 358 would be true or positive. This signal will remain positive during the entire period in which the workpiece holder is traversing a segment of the transfer path to the given destination point. Also the signal on conductor 292 would be positive. The other input to the AND gate 356 from the compare circuit 346 will be true or positive until the press platen reaches an angular position equal to set point number 1. Accordingly, until this point is reached the AND gate 356 produces a true or positive output on conductor 362 which is applied to the input of the NOR circuit 366 and inhibits operation thereof. When the angular position of set point number 1 is reached, however, the compare circuit 346 produces a zero signal and accordingly the AND gate 356 would produce a zero signal. Thus the NOR circuit 366 would produce a positive output pulse which would advance the matrix driver in the reading means to cause the readout of the data corresponding to the next destination point. The AND gate 358 functions in a manner similar to that described for AND gate 356. With regard to AND gate 358, when the destination point $k$ is approached as described above the signal on conductor 294 will be zero and of course the signal on conductor 290 will be positive during the entire traverse to the destination point. Since the signal on conductor 294 is zero the output of the AND gate 358 will be zero during the traverse and after reaching the destination point. Accordingly, the operation of the NOR circuit 366 will not be inhibited as a result of AND gate 358 and when all other inputs of the NOR circuit are zero the circuit will produce a positive output which is applied to the matrix driver 258 to advance the reading means to the data for the next destination point. When the destination point $n$ is being approached and is a check point, gate 358 will function the same as gate 356 functions when point $k$ is approached as described above. In this case there is a pin in the socket of row 6 in column S and input conductor 256$f$ is connected to conductor 294. Thus the conductors 290 and 294 both apply positive input signals to the gate 358. The compare circuit 348 will apply a positive signal to conductor 360 and the gate 358 until the press platen reaches the angular position of set point number 2. Accordingly, until this point is reached the output of the AND gate 358 is positive and it is effective to inhibit operation of the NOR circuit 366. When the set point number 2 is reached, however, the output of compare circuit 348 becomes zero and accordingly the output of gate 358 is zero. The operation of the NOR circuit 366 is no longer inhibited and it produces a positive output pulse which is applied to the input of the matrix driver 258 and the reading means is advanced to the data corresponding to the next destination point.

The operation of the overall system will now be described with reference to the unloading transfer unit 18, it being understood that operation of the loading transfer unit 16 may be identical. The operation of the transfer unit 18 is divided into two phases, namely, the set up or teaching phase in which the desired transfer path is established and the operational phase in which the workpiece holder traverses the transfer path under automatic control.

In the set up or teaching phase the operator will utilize the manual controller 22 with it plugged into the control unit 20 in the appropriate socket for the unloading transfer unit 18. It will be assumed that the transfer path for the loading unit 16 has already been established for the given workpiece 12. Accordingly, it is desired to program the control of transfer unit 18 so that it will operate to remove the successive workpieces from the press during each cycle in properly timed relationship and place the workpieces on the conveyor 34. The transfer path must be established so that the workpiece is manipulated in such a manner that there is adequate clearance with respect to the press, the conveyor and any obstacles that might be present in the vicinity of the transfer unit.

Referring now to FIGS. 2 and 3 the operator will observe the transfer unit 18 and the press 2 while using the controller of FIG. 5 to exercise control over movement of the transfer unit. The starting point for the workpiece holder 28 of the transfer unit may be selected as the position at which the workpiece is deposited onto the conveyor. Thus, the point $j$ is selected as the starting point for the unloading transfer path of the workpiece holder which will traverse several points in its excursion into the press to get the workpiece and back out to deposit the same on the conveyor at the starting point. (Note that the points indicated in FIG. 2 are the points traversed by a reference point on the workpiece holder, for example, the intersection of its horizontal and vertical axes).

In order to manually manipulate the workpiece holder the operator sets the mode switch 200 to the manual position and then proceeds to adjust the $x$, $y$ and $z$ axis controls as desired. In order to move the workpiece holder to the desired starting point $j$ the operator may move it along one axis at a time, for example, by setting the speed control knob 162' for the $y$ axis at zero and setting the speed control knob 210 for the $z$ axis at zero and then setting the switch 208 in the forward position and the speed control switch 206 in position number one. Then the operator may depress the initiate switch and the hydraulic motor 102 will be energized to move the workpiece holder in the forward direction along the $x$ axis. When the desired $x$ coordinate is reached the operator will release the initiate switch and bring the workpiece holder to a stop. In this manner the operator may manipulate the manual controller to produce the desired movement along the $x$, $y$ and $z$ axes and place the workpiece holder at the desired starting point $j$. With the workpiece holder in this position the coordinates of the point $j$ are stored in the data storage means of the $y$ axis, $x$ axis and $z$ axis control means, i.e. the matrices 186, 308 and 330. This is accomplished with respect to the matrix 186 as illustrated in FIGS. 6 and 10 by observing the position read out and inserting pins in the sockets as indicated thereby. In particular the tens read out in binary coded decimal in the window 246 may be zero and accordingly no pins would be inserted in the tens column for row one which corresponds to the starting point $j$. The read out for the units column in window 248 may be three for example as indicated by lights in the ones column (rightmost) and in the twos column. Accordingly, pins 234 will be placed in the corresponding sockets in row one. For the tenths column read out in window 250 the value may be 0.5, for example, as indicated by the lights in the ones column and the fours column. Accordingly, pins 234 will be inserted in these columns in row one. The digital read out in window 252 will, therefore, be 02.5 inches. This read out denotes the $y$ axis coordinate of the workpiece holder from its reference position when it is positioned at the starting point $j$. For the time being no more data is stored in the matrix board for the point $j$, i.e. no more pins are inserted in row one because the direction and valocity in approaching point $j$ in its return path has not yet been established.

In a manner similar to that described with reference to storing the $y$ axis coordinate data in the matrix 186, the $x$ axis and the $z$ axis data are stored in the matrices 308 and 330 for the point $j$.

With the coordinates of starting point $j$ established with respect to each axis and stored in the data storage means it remains to manually control the movement of the workpiece holder and establish the data for additional points on the desired transfer path. The first move of the workpiece holder will need to be upwardly to provide clearance from the workpiece and inwardly toward the press. For this purpose the operator will set the $y$ axis controls with the reversing switch 184' in the forward position and the speed control switch 162' at a relatively low speed, say position number two. The $x$ axis controls will be set with the reversing switch 208 in the forward position and the speed control switch set at position number one. For the first move the workpiece need not be rotated about its $z$ axis so the $z$ axis controls will be set with the speed control switch 210 at the zero position. Since the workpiece holder will be starting from a position of rest at point $j$ the relatively low speed settings will result in relatively low value of acceleration. In initiating movement of the workpiece holder with the controls set for the $x$, $y$ and $z$ axes as desired the operator then depresses the initiate switch 201. This causes the $y$ axis hydraulic motor 72 to be energized in the forward direction at the selected speed setting as described with reference to FIG. 9. Similarly, the $x$ axis hydraulic motor 102 is energized simultaneously while the $z$ axis hydraulic motor 124 remains at rest. Thus, the workpiece holder is set in motion with components of velocity along the x and y axes and the configuration of the path being traversed is determined by the relative values of velocity and acceleration along the respective axes. When the setting of the speed control knob on a given axis calls for a change of velocity, i.e. an acceleration, the value of acceleration is a function of the hydraulic motor and the control system therefor described with reference to FIG. 5. When the workpiece holder is undergoing acceleration the path traced thereby is of arcuate configuration. When the values of velocity along the x and y axis are constant the path traced by the workpiece holder is a straight line.

Referring again to FIG. 2 with reference to the first movement from the starting point j. it will be noted that the path is arcuate in shape because of the acceleration of the workpiece holder from the rest position. When the workpiece holder has reached a desired point as for example point k the operator releases the initiate switch 201 and the drive means of the workpiece holder come to a stop. If the operator is satisfied with this position as being the second point k on the transfer path the data corresponding thereto will be stored in the data storage means. For this purpose the decoded position readout for the y axis will be observed and pins corresponding to the readout data will be inserted in the tens, units and tenths columns of the matrix 186 will be inserted in row two. Additionally, data corresponding to the direction and velocity of the movement to point k will be recorded in the matrix 186. Since the point k was reached by movement in the forward direction a pin is inserted in the F column in row two and since the velocity setting was at position number two for the y axis the pin is inserted in the third column under "velocity" in row two. At this point it will be desirable to use point k as a check point. Since the workpiece holder, on its next move, will be entering into the press and provision must be made to assure proper timing with the press. Accordingly, a pin will be inserted in the y axis matrix 186 in the S column at row two. At this same time it may be determined that the press should be at an angular position such that the platen has just passed bottom dead center, i.e. 180° and is starting to open. Accordingly, set point number one on the manual controller shown in FIG. 5 is set at 234° so that set point circuit 220, through the compare circuit 246 and the sequence means 288, will not allow the workpiece holder to advance beyond point k until the press has reached an angular position of 234°. Thus, the insertion of data corresponding to point k for the y axis is complete. In a similar manner the data corresponding to point k will be inserted in matrices 308 and 330 for the x axis and the y axis, respectively. It is noted, however, that check point data need be inserted in the matrix for one axis only in order to exercise the desired control. operation may be continued for the remainder of the transfer path. Thus, as indicated in FIGS. 2 and 3 additional points l, e, m, n and o are established by the operator in stepping the workpiece holder through its cycle of operation under control of the manual controller 22. Data is inserted into the storage means corresponding to each point. It is noted that the final segment of the transfer path from point o to point j returns the workpiece holder to its starting point and the data corresponding to direction and speed of travel is inserted in line one of the matrices 186, 308 and 330, respectively at that time. It is noted further that a second check point may be used if desired to insure that the workpiece holder is properly synchronized with the press throughout its cycle. It will be observed that the unloading cycle of transfer unit 18 utilizes a transfer path with seven different points. Accordingly, only lines 1 through 7 of the matrices will be used and the ring counter of matrix driver will accordingly be set for a count of seven. The count number of the ring counter is indicated in the sequence readout window 228 thereby indicating which line of data in the matrix is being read and thereby controlling the transfer unit. After the operator has initially established the points on the transfer path it may be desirable to make successive trial operations under manual control so that points on the transfer path may be slightly adjusted so that acceleration values and speed settings may be adjusted for the most efficient handling of the workpiece. These adjustments are made of course by movement of the pins in the appropriate columns of the matrix board. Once the transfer path is finally established and the data corresponding thereto is inserted in the data storage means, the system is ready for automatic operation.

For operation in the automatic mode the mode switch 200 is set in the automatic position. This closes switches 164 and 182 to connect matrix 186 to the motor control circuit 280 as shown in FIG. 8. Similarly, switches 310 and 312 are operated to connect matrix 308 with motor control 314 and switches 336 and 332 are closed to connect matrix 330 with motor control circuit 334. In a cycle of operation starting with the workpiece holder at the starting point j the data reading means including, matrix driver 258 will apply input voltage on input conductor 256b in row two of matrix 186. Similarly, the matrix driver will apply an input signal on the input conductor in row two of matrices 308 and 330. Accordingly, a destination signal for point k, i.e. the y axis coordinate thereof is applied by the matrix 186 to the compare circuit 286. Similarly, the matrix 308 applies a destination signal to the compare circuit 306 and the matrix 330 applies a destination signal to the compare circuit 328. At the same time the matrix 186 applies a direction and velocity signals to the motor control circuit 280. Similarly, matrices 308 and 330 apply the direction and velocity signals to the motor control circuits 314 and 334, respectively. Accordingly, the hydraulic motors 72, 102 and 124 are energized in accordance with their respective direction and velocity signals. In the movement between points j and k hydraulic motor 72 will be energized and will drive the rotary pulse generator 94 which provides signals through the directions sense circuit 280 to the position counter 282. The counter 282 thus produces a position signal which is applied to the input of the compare circuit 286. As long as the actual position of the workpiece holder along the y axis is short of the destination point k the compare circuit 286 will produce a true or positive output signal on conductor 287 which is applied to one input of the NOR circuit 366 thus inhibiting operation of the same. Similarly, the hydraulic motor 102 will displace the workpiece holder along the x axis and will drive the rotary pulse generator 120. The generator produces signal pulses which are applied through the direction sense circuit 300 to the position counter 302 which applies an actual position signal to the other input of the compare circuit 306. The output of the compare circuit 306 is applied through conductor 316 to another input of the NOR circuit 366 and will be true or positive until the destination point is reached. As mentioned above, during the first move from point j to k no motion is required about the z axis and the hydraulic motor 124 is at rest. Accordingly, the actual position signal produced by position counter 324 is equal to the destination signal produced by the matrix 330 and the compare circuit 328 will produce a zero output signal on conductor 338 which is applied to an input of the NOR circuit 366. When the workpiece holder reaches the destination point k along the y axis the compare circuit 286 will produce a zero signal and the motor control circuit 280 will deenergize the motor 72 and the zero signal on conductor 287 will be applied to the NOR circuit 366. Similarly, when the workpiece holder reaches the destination point k along the x axis the compare circuit 306 will produce a low signal and the hydraulic motor 102 will be deenergized and the signal will be applied through conductor 316 to the NOR circuit 366. Thus, the workpiece holder will be at point k and in readiness to advance to the next succeeding destination point. However, point k has been established as a check point by set point circuit 220, conductor 292 and a pin in the column S at row two. Accordingly, a positive signal is applied over conductor 290 to an input of AND gates 356 and 358 as long as the data of row two is being read. Also a positive signal is applied to conductor 292 from the matrix 186 to another input of the AND gate 356 as long as the data for point k is being read. Note that the signal on conductor 294 which is connected to the input conductor of row six corresponding to point n is a zero signal, since the data corresponding to this point is not yet being read and no input signal is applied thereto. Accordingly, the AND gate 358 will produce a zero output signal irrespective of the signal input derived from the compare circuit 348. Thus AND circuit 358 will not be effective to inhibit operation of the NOR circuit 366. Referring back to AND gate 356, however, the input thereto from the compare circuit 346 will be at a positive value until the press has reached the point in its cycle corresponding to set point number one of set point circuit 220. Specifically, in the example given for point k all of the inputs to the AND gate 356 will be at a positive value until the press reaches an angular position of 234° as indicated by the position counter 344 at which point the output signal of the compare circuit 346 will become zero whereupon the AND gate 356 will produce a zero output signal and all inputs to the NOR circuit 366 will become zero. As a result, the NOR circuit will produce an output pulse which is applied to the input of the matrix driver 258 to advance the input signal to the next row in the matrix 186 and in the matrices 308 and 330 thereby initiating the reading of the data corresponding to the next destination point on the transfer path.

The operation continues in the manner just described for succeeding points on the transfer path until the cycle is completed. It will be understood that in the absence of a check point input for any given point on the transfer path the output of the AND gates 356 and 358 will be zero throughout reading of data for that point and accordingly the NOR circuit 366 will not be inhibited thereby but will provide a signal to the matrix driver as soon as the workpiece holder has reached the destination point on all three axes. It will be further understood that the motion of the workpiece holder is caused to be substantially continuous, i.e. without stopping at destination points on the transfer path by proper adjustment of speed values for the different segments of the path except of course for the dwell positions which are purposely provided.

Although the description of this invention has been given with respect to a particular embodiment it is not to be construed in a limiting sense. Many variations and modifications of the invention will now occur to those skilled in the art. For a definition of the invention reference is made to the appended claims.

I claim

1. Automatic transfer apparatus adapted for moving a workpiece relative to a cyclically operated processing machine with power means for operating the machine, said transfer apparatus comprising a workpiece holder, motive power means connected with the workpiece holder, destination signal generating means adapted to produce destination signals corresponding to plural selected points on a predetermined transfer path in succession, control means connected with the destination signal generating means and being operative to energize the motive power means to displace the workpiece holder to the destination point corresponding to the destination signal, timing signal generating means adapted to be connected with one of said power means to produce an enabling signal at a predetermined point in each cycle of operation, sequence means responsive to the arrival of the workpiece holder at the destination point and the occurrence of an enabling signal to produce a sequence signal, said sequence means being connected with the destination signal generating means to apply the sequence signal thereto whereby the workpiece holder is caused to move to the next succeeding point of the predetermined transfer path.

2. The invention as defined in claim 1 and further including a position signal generating means connected with the motive power means for generating signals corresponding to the actual position of the workpiece holder, said control means being connected additionally with the position signal generating means to produce a control signal effective to cause energization of the motive power means when the destination signal differs from the actual position signal.

3. The invention as defined in claim 2 wherein said destination signal generating means includes a data storage means for storing data defining said plural selected points, and data reading means connected with said storage means and adapted to read the stored data and produce destination signals corresponding to said selected points in succession in response to successive occurrences of a sequence signal.

4. The invention as defined in claim 3 wherein said data storage means also stores data defining the desired velocity of said workpiece holder between successive selected points, said data reading means being adapted to produce velocity signals corresponding to said velocity data in succession in response to successive occurrences of a sequence signal and to apply said velocity signals to said control means to regulate the energization of said motive power means.

5. The invention as defined in claim 4 wherein said data storage means also stores data defining the direction of movement required to reach the destination, said data reading means being adapted to produce direction signals corresponding to the direction data, and power controlling means in the control means and being responsive to the control signal and to said velocity signal and said direction signal to cause energization of the motive power means to displace the workpiece holder toward the destination point at a velocity corresponding to said velocity signal.

6. The invention as defined in claim 5 and further including a manual controller connectable to said power controlling means and adapted to supply manually selected direction signal and a manually selected velocity signal thereto whereby trial movements of said workpiece holder may be effected, said data storage means including manually settable elements to define the position of successive points on a transfer path and to define the velocity of movement between such points.

7. The invention as defined in claim 6 wherein said data storage means includes a manually settable element to define the position of a check point, said data reading means being effective to produce a check point signal and being connected with said sequence means to disable the same until said enabling signal is applied thereto, whereby said workpiece holder will not advance beyond said check point until the processing machine has reached said predetermined point in its cycle.

8. The invention as defined in claim 7 wherein said data storage means comprises an array of binary elements disposed in columns and rows with a first group of elements in each row representing the position of a point and a second group of elements defining velocity of movement between points, said elements being settable and resettable by manual operation.

9. The invention as defined in claim 8 wherein said array of binary elements comprises a pinboard including columns and rows of sockets adapted to receive removable pins for setting and resetting the elements, column conductors each of which is connected with all sockets in a respective column, row conductors each of which is connected with all sockets in a respective row, and said reading means comprises means for sequentially applying an input voltage to said row conductors whereby a pin in a socket in a given row conductor causes an output voltage on the column conductor corresponding to said socket.

10. Automatic transfer apparatus adapted for moving a workpiece relative to a cyclically operated processing machine, said transfer apparatus comprising a workpiece holder, first and second motive power means connected with the workpiece holder for moving it along first and second axes, first and second destination signal generating means adapted to produce destination signals corresponding to plural selected points on a predetermined transfer path in succession in response to successive occurrences of a sequence signal, first and second position signal generating means connected with the first and second motive power means for generating signals corresponding to the actual position of the workpiece holder on the first and second axes, first and second control means connected respectively with the first and second destination signal generating means and the first and second position signal generating means and being operative to energize the first and second motive power means to displace the workpiece holder to the destination point corresponding to the destination signal, timing signal generating means adapted to be connected with said processing machine to produce an enabling signal at a predetermined point in each cycle of operation of said machine, sequence means responsive to the arrival of the workpiece holder at the destination point and the occurrence of an enabling signal to produce a sequence signal, said sequence means being connected with the destination signal generating means to apply the sequence signal thereto whereby the workpiece holder is caused to move to the next succeeding point of the predetermined transfer path.

11. The invention as defined in claim 10 wherein each of said destination signal generating means comprises data storage means for storing data defining the plural selected points on the predetermined transfer path and data reading means connected with said storage means and adapted to produce said destination signals.

12. The invention as defined in claim 11 wherein said first and said second data storage means is adapted to store data defining a predetermined direction and velocity for said workpiece holder between succeeding points on the transfer path, said first and second data reading means being adapted to produce velocity and direction signals corresponding to the data in succession in response to successive occurrences of said sequence signal whereby the movement of the workpiece holder between successive points is effected at individually predetermined velocities.

13. The invention as defined in claim 12 wherein said first and second control means includes respectively first and second comparing means connected respectively with the first and second data reading means and the first and second position signal generating means and each producing a control signal, said first and second control means also including respectively first and second poser controlling means connected respectively with the first and second comparing means and with the first and second data storage means and being responsive to the control signal, the velocity signal and the direction signal to cause energization of the first and second motive power means to displace the workpiece holder until the control signal is nullified.

14. The invention as defined in claim 12 and further including a manual controller connectable to said power controlling means and adapted to supply a manually selected direction signal and a manually selected velocity signal thereto whereby trial movements of said workpiece holder may be effected, said data storage means including manually settable elements to define the position of successive points on a transfer path and to define the velocity of movement between such points.

15. The invention as defined in claim 14 wherein said data storage means includes a manually settable element to define the position of a check point, said data reading means being effective to produce a check point signal and being connected with said sequence means to disable the same until said enabling signal is applied thereto, whereby said workpiece holder will not advance beyond said point until the processing machine has reached said predetermined point in its cycle.

16. The invention as defined in claim 15 wherein said data storage means comprises an array of binary elements disposed in columns and rows with a first group of elements in each row representing the position of a point and a second group of elements defining velocity of movement between points, said elements being settable and resettable by manual operation.

17. The invention as defined in claim 16 wherein said array of binary elements comprises a pinboard including columns and rows of sockets adapted to receive removable pins for setting and resetting the elements, column conductors each of which are connected with all sockets in a respective column, row conductors each of which is connected with all sockets in a respective row, and said reading means comprises means for sequentially applying an input voltage to said row conductors whereby a pin in socket in a given row conductor causes an output voltage on the column conductor corresponding to said socket.

18. The invention as defined in claim 10 and further comprising a third motive power means connected with the workpiece holder for rotating it about a third axis, a third destination signal generating means adapted to produce a signal corresponding to an angular displacement of the holder, a third position signal generating means connected with the third motive power means for generating an angular position signal, third control means connected with the third destination signal generating means and the third position signal generating means and being operative to energize the third motive power means to displace the workpiece holder to the angular position corresponding to the destination signal.

19. Automatic transfer apparatus adapted for moving a workpiece relative to a cyclically operated processing machine which includes a prime mover, said transfer apparatus comprising a workpiece holder movable along first and second coordinate axes, first and second motive power means independent of said prime mover and connected with the workpiece holder for moving it forward and backward along the first and second axes respectively, first and second destination data storage means for storing data defining the coordinates of plural selected points on a desired transfer path of said workpiece holder, first and second data reading means connected with said storage means and adapted to read the stored data and produce destination signals corresponding to selected points on said path in succession in response to successive occurrences of a sequence signal, first and second position signal generating means connected with the first and second motive power means for generating signals corresponding to the actual position of the workpiece holder on the first and second axes, first and second comparing means connected respectively with the first and second data reading means and the first and second position signal generating means and producing a control signal, first and second power controlling means connected respectively with the first and second comparing means and responsive to the control signal to cause the energization of the first and second motive power means to displace the workpiece holder until the control signals are nullified, timing signal generating means adapted to be connected with said processing machine to produce an enabling signal at a predetermined point in each cycle of operation of said machine, sequence means connected with the first and second comparing means and with the timing signal generating means to produce a sequence signal when the control signals are nullified and said enabling signal is present thereby signifying that the desired destination point has been reached and that the movement of the workpiece holder is properly synchronized with said machine, said sequence means being connected with the reading means to apply the sequence signal thereto whereby the workpiece holder is caused to move to the next succeeding point on the desired transfer path.

20. The invention as defined in claim 19 wherein said data storage means also stores data defining the desired direction and velocity of said workpiece holder between successive selected points, said data reading means being adapted to produce direction and velocity signals corresponding to said data in succession in response to successive occurrences of a sequence signal and to apply said direction and velocity signals to said power controlling means to regulate the energization of said motive power means.

21. The invention as defined in claim 20 including a manual controller connectable to said power controlling means and adapted to supply manually selected direction signal and a manually selected velocity signal thereto whereby trial movements of said workpiece holder may be effected, said data storage means including manually settable elements to define the position of successive points on a transfer path and to define the velocity of movement between such points.

22. The invention of as defined in claim 21 wherein said data storage means includes a manually settable element to define the position of a check point said data reading means being effective to produce a check point signal and being connected with said sequence means to disable the same until said enabling signal is applied thereto, whereby said workpiece holder will not advance beyond said check point until the processing machine has reached said predetermined point in its cycle.

23. The invention as defined in claim 22 wherein said data storage means comprises an array of binary elements disposed in columns and rows with a first group of elements in each row representing the position of a point and a second group of elements defining velocity of movement between points, said elements being settable and resettable by manual operation.

24. The invention as defined in claim 23 wherein said array of binary elements comprises a pinboard including columns and rows of sockets adapted to receive removable pins for setting and resetting the elements, column conductors each of which are connected with all sockets in a respective column, row conductors each of which is connected with all sockets in a respective row, and said reading means comprises means for sequentially applying an input voltage to said row conductors whereby a pin in socket in a given row conductor causes an output voltage on the column conductor corresponding to said socket.

* * * * *

UNITED STATES PATENT OFFICE
CERTIFICATE OF CORRECTION

Patent No. 3,668,498            Dated June 6, 1972

Inventor(s) Albert A. Austin, Jr.

It is certified that error appears in the above-identified patent and that said Letters Patent are hereby corrected as shown below:

Column 4, line 67 (Specification, page 9, line 31) "ac" should be --at--. Column 6, line 58 (Specification, page 14, line 160) "!60" should be --160--. Column 8, line 49 (Specification, page 18, line 20) "insulting" should be --insulating--. Column 9, line 7 (Specification, page 19, line 22) after "respectively", delete "required for the direction forward or reverse, respectively,". Column 14, line 44 (Specification, page 32, line 15) "valocity" should be --velocity--. Column 15 line 51 (Specification, page 35, line 1) before "operation" insert --In the manner just described, the set up--; line 53 (Specification, page 35, line 3) "1" should be --l-- and "o" should be --0--. Column 19, line 37 (Claim 13, line 7) "poser" should be --power--. Column 21, line 1 (Claim 22, line 1) after "invention" delete "of".

Signed and sealed this 26th day of December 1972.

(SEAL)
Attest:

EDWARD M. FLETCHER, JR.
Attesting Officer

ROBERT GOTTSCHALK
Commissioner of Patents